United States Patent
Kett et al.

(10) Patent No.: US 7,660,903 B2
(45) Date of Patent: Feb. 9, 2010

(54) COMMUNICATIONS NETWORK

(75) Inventors: Richard J M Kett, Woodbridge (GB); Jeremy R. Mason, Ipswich (GB)

(73) Assignee: British Telecommunications public limited company, London (GB)

( * ) Notice: Subject to any disclaimer, the term of this patent is extended or adjusted under 35 U.S.C. 154(b) by 964 days.

(21) Appl. No.: 10/168,616

(22) PCT Filed: Jan. 12, 2001

(86) PCT No.: PCT/GB01/00121

§ 371 (c)(1),
(2), (4) Date: Jun. 24, 2002

(87) PCT Pub. No.: WO01/54424

PCT Pub. Date: Jul. 26, 2001

(65) Prior Publication Data

US 2002/0194336 A1    Dec. 19, 2002

(30) Foreign Application Priority Data

Jan. 24, 2000    (EP) .................................. 00300480

(51) Int. Cl.
*G06F 15/16*    (2006.01)
(52) U.S. Cl. ................................... 709/229
(58) Field of Classification Search ................ 709/217, 709/225, 224, 227, 229; 705/54
See application file for complete search history.

(56) References Cited

U.S. PATENT DOCUMENTS

| | | | | |
|---|---|---|---|---|
| 5,329,619 A | * | 7/1994 | Page et al. | 709/203 |
| 5,862,325 A | * | 1/1999 | Reed et al. | 709/201 |
| 5,862,331 A | * | 1/1999 | Herriot | 709/219 |
| 5,991,790 A | * | 11/1999 | Shah et al. | 718/100 |
| 6,202,159 B1 | * | 3/2001 | Ghafir et al. | 726/3 |
| 6,341,351 B1 | * | 1/2002 | Muralidhran et al. | 726/9 |
| 6,556,544 B1 | * | 4/2003 | Lee | 370/256 |
| 6,769,024 B1 | * | 7/2004 | Natarajan et al. | 709/224 |
| 6,873,609 B1 | * | 3/2005 | Jones et al. | 370/329 |
| 6,874,011 B1 | * | 3/2005 | Spielman et al. | 709/206 |
| 6,925,493 B1 | * | 8/2005 | Barkan et al. | 709/223 |
| 2002/0095454 A1 | * | 7/2002 | Reed et al. | 709/201 |
| 2007/0088819 A1 | * | 4/2007 | Sinha | 709/224 |

FOREIGN PATENT DOCUMENTS

WO    97/36430    10/1997

OTHER PUBLICATIONS

Jain et al, "Java Call Control, Coordination, and Transactions", IEEE Communications Magazine, vol. 38, No. 1, Jan. 2000, pp. 108-114, XP002139802.

* cited by examiner

*Primary Examiner*—Nathan Flynn
*Assistant Examiner*—Chirag R Patel
(74) *Attorney, Agent, or Firm*—Nixon & Vanderhye P.C.

(57) ABSTRACT

A registration server in a network implementing an API (application programming interface) authenticates services and provides discovery of network resources, prior to registering services with selected network resources. Multiple instances of services and/or multiple service nodes are registered in a single service agreement.

15 Claims, 8 Drawing Sheets

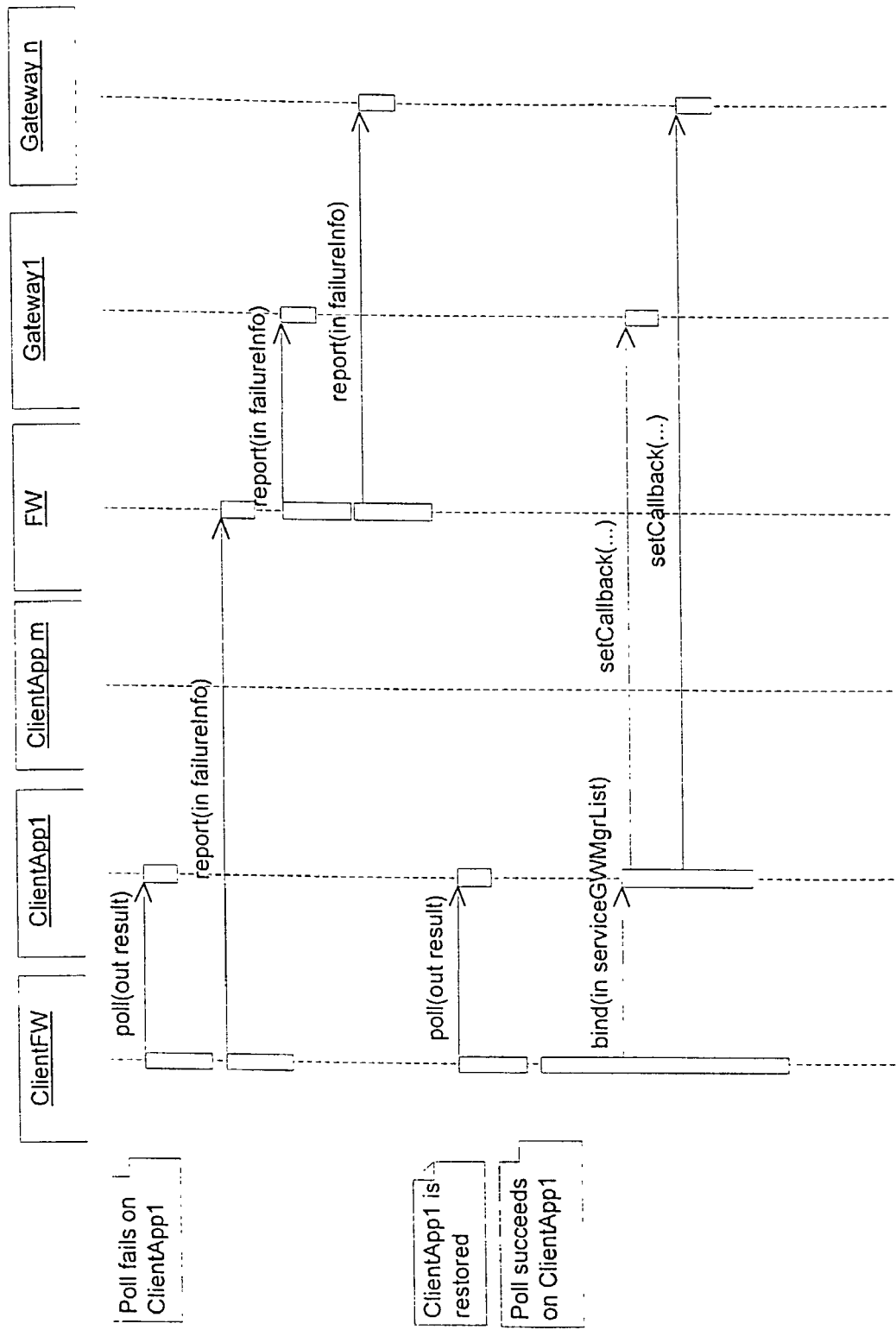

COMMUNICATIONS NETWORK

This application is the U.S. national phase of international application PCT/GB01/00121 filed 12 Jan. 2001 which designated the U.S.

BACKGROUND

1. Technical Field

The present invention relates to a communications network, and in particular to a registration server and to other components implementing a programmable interface to resources in such a network.

2. Description of Related Art

Conventionally, advanced communications services in a telecommunications network have been implemented using an IN (intelligent network) architecture. In such an architecture, the control logic and various network resources required to implement advanced services are tightly integrated with the communications network, and in general are intended to be run under the control of the network operator. Such an approach allows robust large-scale applications to be implemented. However, the architecture tends to be relatively inflexible, so that developing and deploying new services can be time-consuming. In addition, it can be difficult to make network resources available to service providers other than the network operator, while maintaining the security and integrity of the network.

Recently, there has been interest in developing communications applications using computing platforms located at the edge of the network and typically operated under the direct control of the service provider. However, since such CTI (computer telephony integration) applications have only indirect and limited access to the capabilities of the network, this approach often results in inefficient use of network resources.

It has been proposed to implement communications networks that include an application programming interface (API) between service components embedded in the network, and applications running at the edge of the network. Such an approach combines the benefits of the economies of scale and of reliability offered by conventional network intelligence architectures, with the flexibility and accessibility of the edge of network approach.

A network including an API as described above has been developed by the present applicant in conjunction with other members of the Parlay Organisation. The Parlay Organisation has published a specification for the API together with resources to aid implementation. An overview of the Parlay API is contained in the document "Parlay API Business Benefits White Paper", Parlay Organisation, Jun. 11, 1999, Published at www.parlay.org. Versions 1.2 and 2 of the Parlay API specification are also available from the same site.

In implementing a communications network with a service API, a registration server is used to control access by edge-of-network service applications to components in the network that provide service resources. The registration server may be used to carry out an authentication process in which the identity of a service application, and the authority of the owner of that application to access network resources, is checked, for example, using a digital signature, and a database listing authorised users of the network. The registration server may also be used for the process of discovery, in which, in response to a request from a service application, the registration server provides details of available network resources. Subsequently, the registration server registers a service application with one or more services resources. This may be done by communicating to the service application the logical identity and physical address of a service manager object on a particular service node and/or communicating to the service manager object data identifying the corresponding service application.

BRIEF SUMMARY OF EXEMPLARY EMBODIMENTS

A method of operating a communications network including one or more service nodes, a registration server arranged to control access by service applications to the one or more service nodes, and a platform remote from the registration server running one or more communications service applications, the method including:
 a) distributing data identifying service resources available on the or each service node connected to the communications network;
 b) communicating to the registration server a request for access by at least one of the service applications running on the said platform to at least some of the service resources identified in step (a);
 c) at the registration server, in response to the request of step (b), executing a service agreement permitting access by the service application to the one or more service nodes providing the said requested services resources;
 d) subsequently binding the service application to the one or more service nodes;

characterised in that in step (c) the service agreement specifies plural instances of the service application and/or specifies a plurality of service nodes and in that step (d) includes at least one of
 (i) binding a plurality of instances of the service application to the one or more service nodes; and/or
 (ii) binding at least one instance of the service application to a plurality of service nodes.

In the description and claims of the present application, the term "service node" is used broadly to denote a node of the network which provides resources for running communications services. It includes, but is by no means limited to, computing platforms located at the edge of the network and used for specialised services such as messaging.

Step (d) may include binding a plurality of instances of the service application to the at least one service node, and the method may further include distributing successive initial event notifications between the plurality of instances of the service application. The method may alternatively include registering a plurality of service nodes with at least one instance of the service application, and distributing successive initial session requests between the plurality of service nodes.

In the example described below, the service node is a service control point in a network using an IN (intelligent network) architecture.

The present invention provides a method of implementing an API in a communications network that is better able to support applications requiring a high degree of resilience. This is achieved by amending the implementation of the API so that the process of registration is no longer limited to creating one-to-one bindings between service applications and service nodes, but instead allows several instances of a service application to be registered with a node and or several different nodes to be registered with one service application.

BRIEF DESCRIPTION OF THE DRAWINGS

Systems embodying the present invention will now be described in further detail with reference to the accompanying drawings in which:

FIG. 8 is a diagram showing client application failure and restoration.

DETAILED DESCRIPTION OF EXEMPLARY EMBODIMENTS

Figure 1:
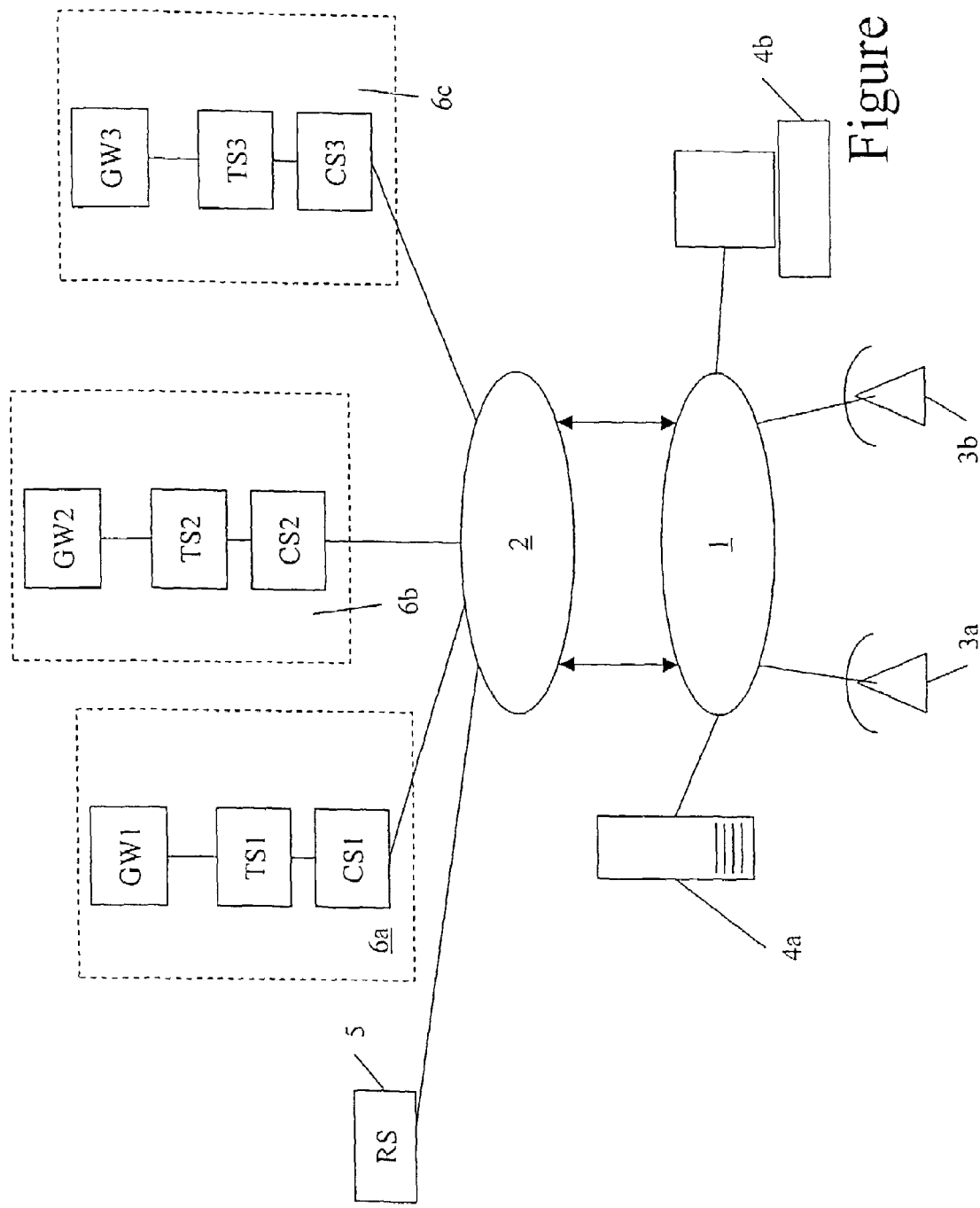
FIG. 1 is a diagram showing a diagram showing a network embodying the invention.

A communications network comprises an access network 1 and a core network 2. Customer terminals 3a, 3b are connected to the access network 1. Service provider platforms 4a, 4b are also connected to the access network 1. A registration server 5 is connected to the network and, as is further described below, is used in implementing an API (application programmers interface) to network resources. Those network resources include a number of service nodes 6a, 6b, 6c, each of which includes a respective gateway GW1, GW2, GW3. The service nodes include hardware and software for running for example, number translation applications, interactive voice recognition and messaging services. As noted above, the term "service node" is used here broadly to denote a node used in running a service application, and is not limited to nodes at edge-of-network locations.

Figure 2:
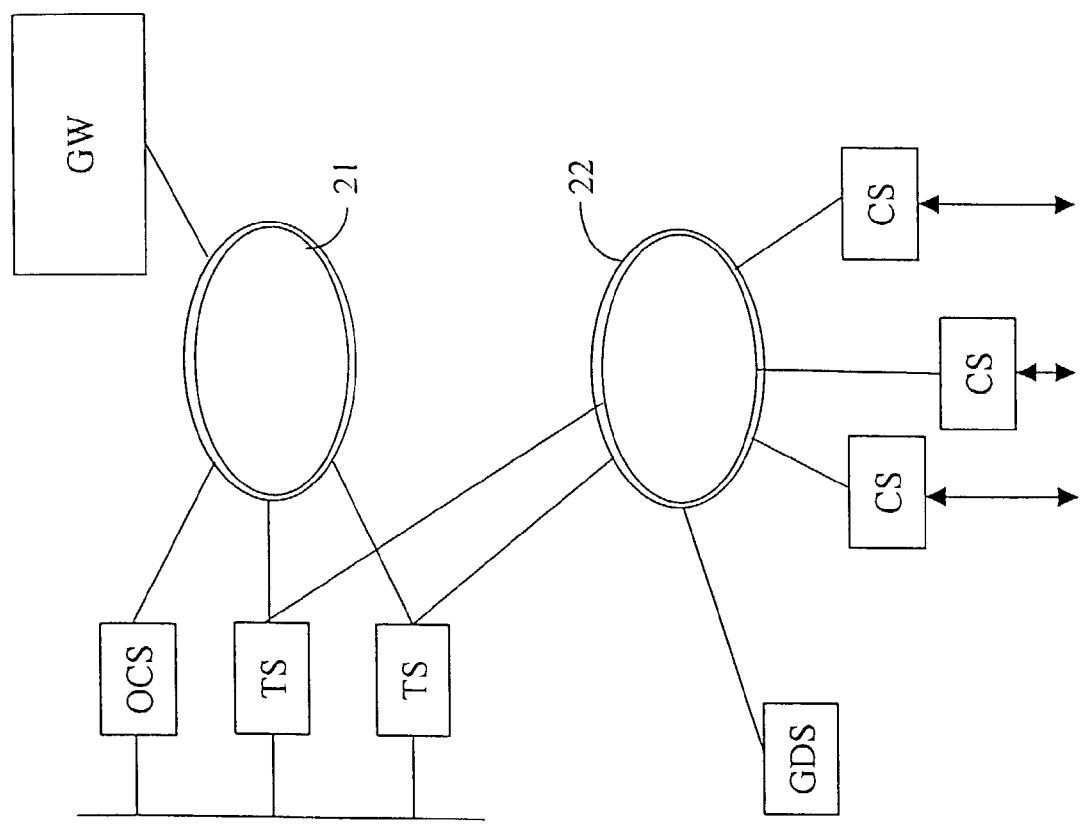
FIG. 2 is a diagram showing in further detail a service platform for use in the network of FIG. 1.

FIG. 2 shows in further detail the architecture of one of the service resource nodes. In this example, the service node is a platform known as the network intelligence platform (NIP). It includes a number of communications servers (CS) that terminate network signalling, in this example signalling system number 7 (SS7) common channel signalling. A global data server (GDS) monitors signalling rates and collects call statistics. Transaction servers (TS) implement the basic service control functions required by the service node. An overload control server (OCS) implements overload control protection both for the service node and for components downstream from the service node. For example, the OSC may initiate call-gapping when an overload condition is detected. The overload control server and transaction servers are connected to a common high-speed bus. The gateway (GW) supports a number of instances of service manager objects that allocate the resources of the different components within the service node to a particular service application. The different servers making up the service node may each be implemented on a respective UNIX workstation. The different servers communicate via high speed optical fibre (FDDI) local area networks (LANS) 21, 22.

Figure 3:
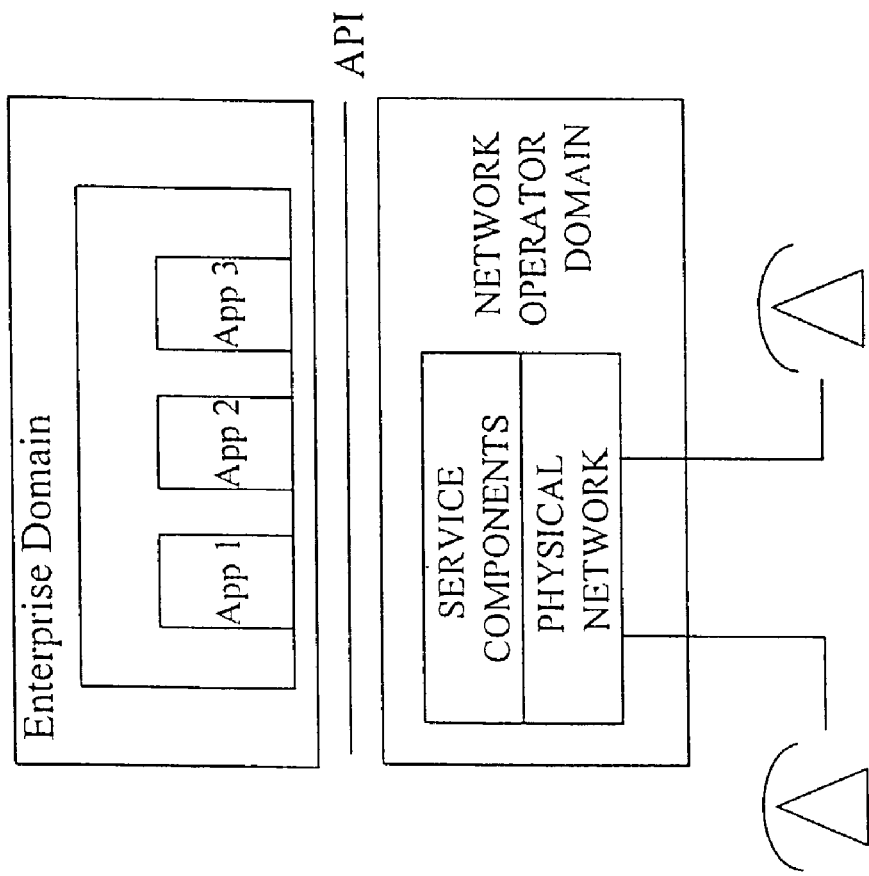
FIG. 3 is a schematic illustrating the use of an API in the network of FIG. 1.

As is shown schematically in FIG. 3, the communications network implements an application programmers interface (API) between applications running at the edge of the network in the so-called "enterprise domain" and the network components used to implement the services in the network operator domain. In this example, the interface is that defined in the Parlay API specification.

Figure 4:
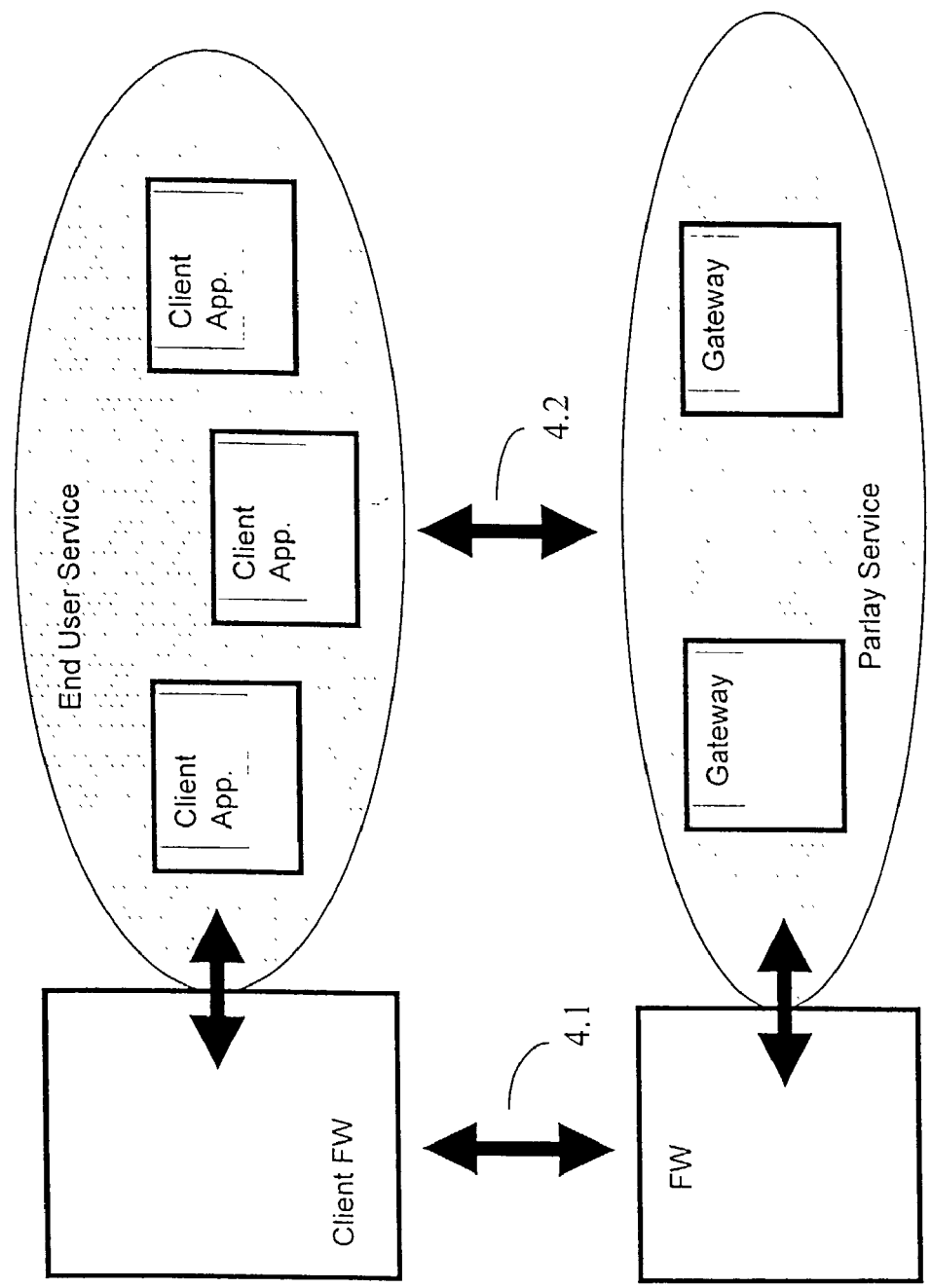
FIG. 4 is a diagram showing interfaces between different components of a network embodying the invention.

FIG. 4 shows in further detail the interfaces between components of the network implementing the Parlay interface. The interface is object-oriented and is implemented using two categories of interface: firstly, service interfaces and secondly, framework interfaces. The service interfaces of applications access to the capabilities of the network. The framework interfaces provide a surround for the service interfaces. The framework interface implements processes of authentication, discovery and registration. The framework objects in the network domain communicate with client FW objects in the user domain. In addition, there is a direct interface 4.2 between client applications and Parlay services. However, these direct interfaces 4.2 are normally only accessed after an application has signed-on via the framework interface 4.1.

In this example, objects implementing the framework FW reside on the registration server 5. The client applications and client FW run on the service provider platforms 4a, 4b. The Parlay services including the gateways are embodied in the service nodes 6a, 6b, 6c.

When one of the client applications is initialised, it first signs-on with the Parlay API via the registration server. A Parlay authentication object is instantiated on the registration server and provides an authentication interface that enables mutual authentication of the registration server and the client application. In the process of authentication, the application returns an identifying code to the registration server. The registration server includes a database of recognised applications. The registration server performs a look-up on the application ID and may also retrieve a cryptographic key specific to the application.

In the discovery phase, applications request from the registration server discovery of a service feature identified by a property name and property values. The Parlay API specification defines a set of property names. Parlay services register with the registration server using the appropriate name. In response to the discovery request, the registration server returns a service ID which identifies the requested network service. Subsequently, the application selects the service. To do this, the application returns to the server the service ID received in response to the discovery enquiry. The registration server then returns a service token which uniquely identifies an instance of the service. Subsequently, before the application can make use of the service, it digitally signs an agreement with the registration server. The digital signature is stored with data including the application ID and the service token. This digital agreement may be used, for example, as the basis for subsequent charging by the network operator for use of its network service. When the agreement has been signed, the registration server returns to the application a reference to the object which implements the requested network service manager interface.

Implementation of the Parlay interface described above is described in further detail in the Parlay API specification 1.2. However, in implementing the invention, some modifications are required to each of the interfaces. As conventionally implemented, each single service agreement created using the Parlay interface has linked a single gateway to a single client application. In the present network embodying the invention, the interface is modified to link multiple gateways to multiple client applications under a single service agreement. In this way it is possible for a Parlay-supported end user service to be resilient against gateway or client application failure. Each service manager residing in a gateway is given the capability to forward initial event notifications, for example notification of an incoming call, to available client applications using a distribution algorithm, for example a round-robin algorithm. Similarly, on the client side, the client application support layer is able to invoke initial session requests. For example, a request to create a call, to one of a number of available gateways using a distribution algorithm. In addition to these features, the framework FW now includes a polling mechanism to detect the current state of the gateways that support a registered service. Detection of a failed gateway may be used to trigger an alarm. The availability of each of the gateways serving the client application is reported to the client framework. When a restored gateway is detected, after an outage, the framework requests the instantiation of a new service manager and posts a reference to the new service manager to the client FW. The client FW implements a polling mechanism that detects the current state of client applications. Detection of a failed client application may be used to trigger an alarm. The availability of each of the client applications is reported to the framework FW. When a restored client application is detected after an outage, the client FW communicates to the new client application a full list of references to the service managers.

The modifications to the Parlay API will now be described in relation to each of the specific interfaces shown in FIG. 4. One of those interfaces, that between the client framework and the client application does not form part of the Parlay API specification but is defined here as an aid to the description of the system as a whole.

FW—Service Interface

Figure 5:
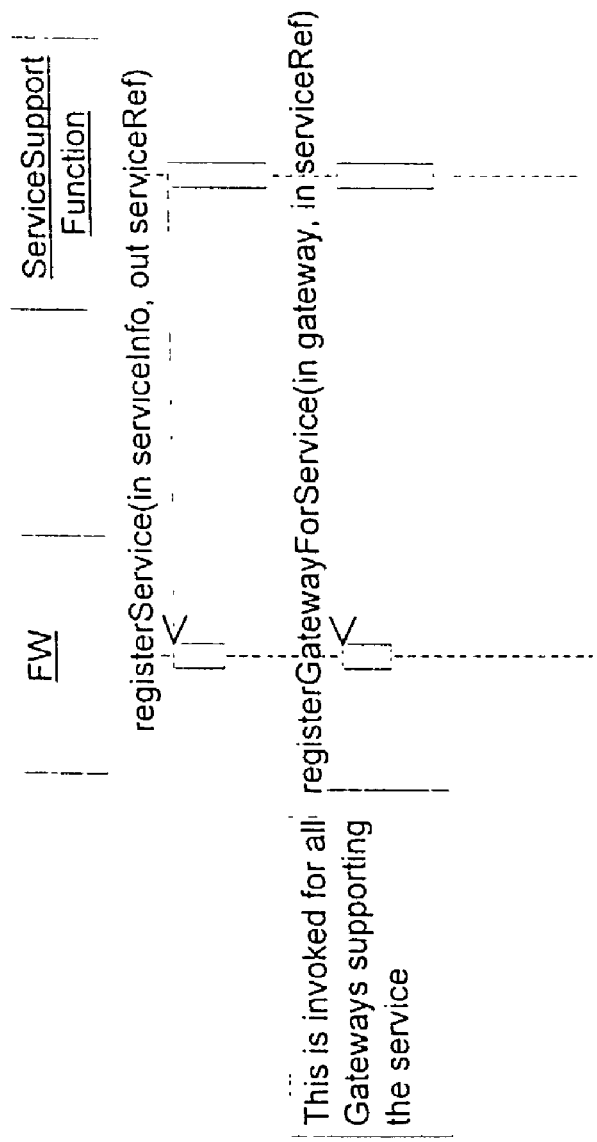
FIG. 5 is a message sequence chart for start-up and registration of gateways.
Figure 6:
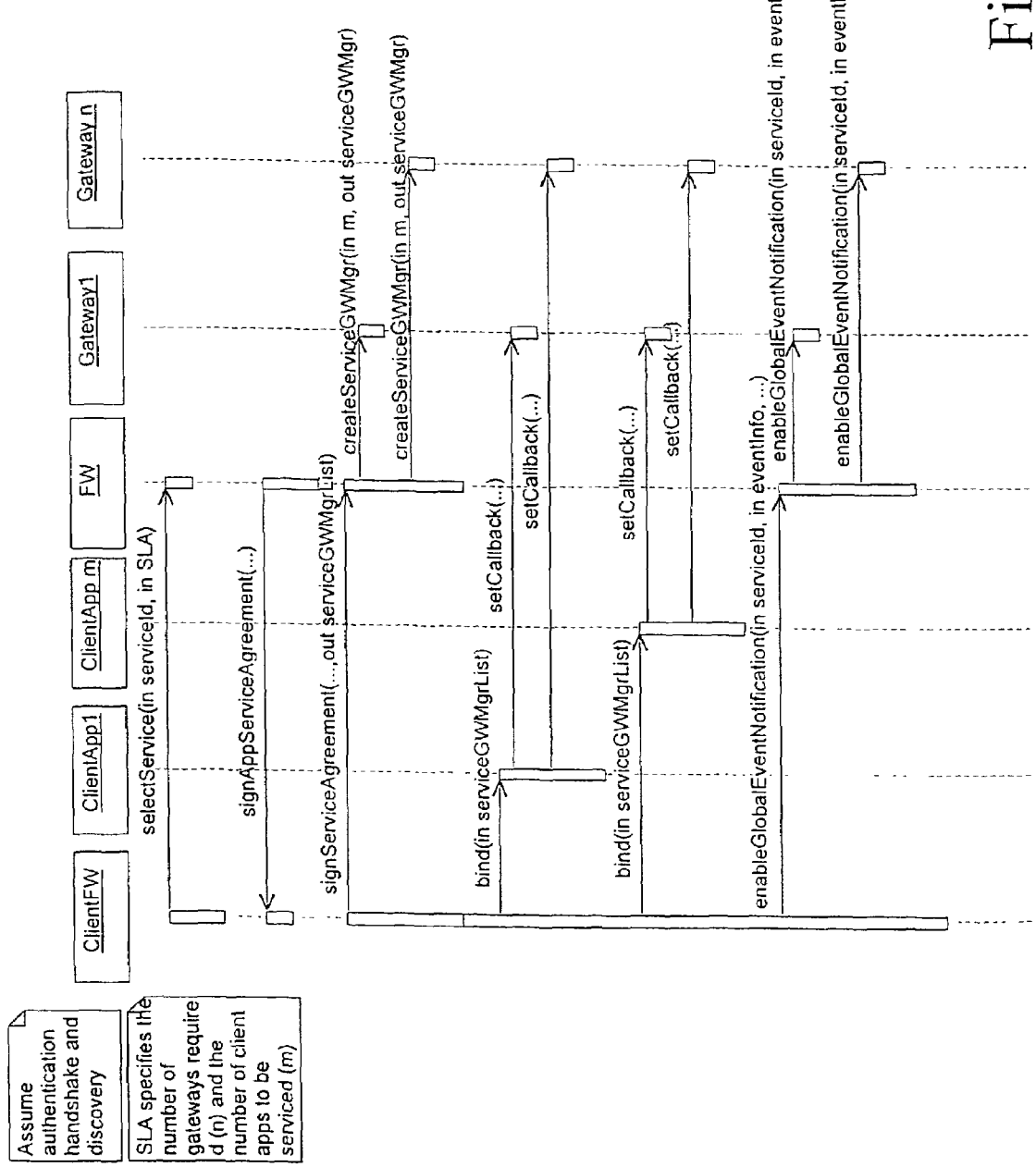
FIG. 6 is a message sequence chart for service start-up.

Parlay Service Registration
1. Parlay services are registered with the FW. To enable a parlay service to be supported across more than one gateway, the registration of the parlay service is distinct from the registration of the individual gateways that support that service. As shown in the message sequence chart of FIG. 5, the service node first requests registration with the FW, and subsequently invokes registration of all the gateways supporting the service. A separate invocation is sent for each gateway Start-up
1. As shown in FIG. 6, the FW requests the creation of a parlay service gateway manager in all gateway that supports the parlay service. A reference to the new service gateway manager is returned by the gateway.
2. Once the bind has been competed, the FW passes global event notification information to the service gateway managers. For example, the information might include the number ranges that the application owns. This information is stored in a database.

Figure 7:
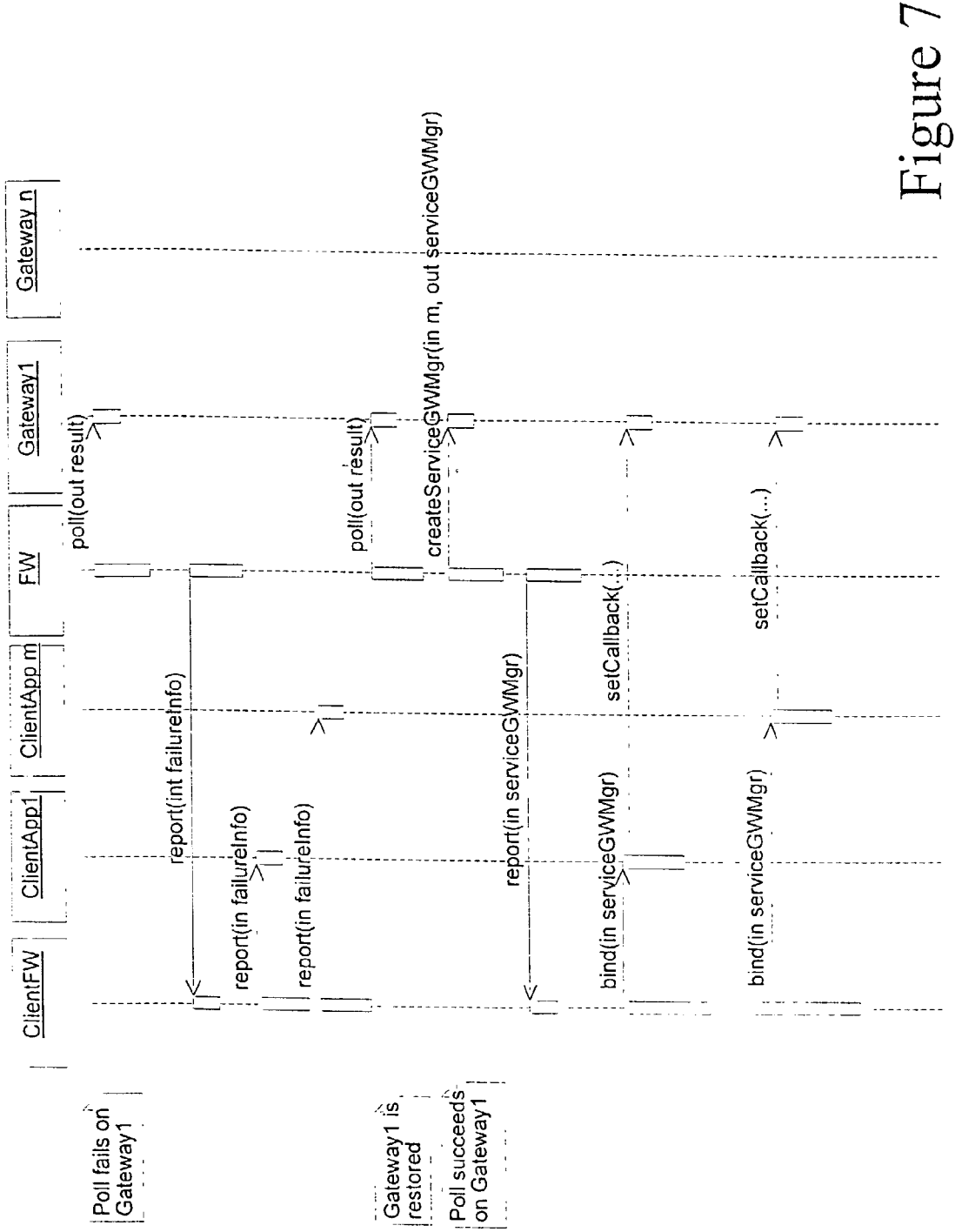
FIG. 7 is a message sequence chart showing gateway failure and restoration.

Failure and Restoration of a Gateway
1. As shown in FIG. 7, the FW detects the failure of a gateway and raises an appropriate alarm.
2. The FW detects the restoration of a gateway and requests the instantiation of a new parlay service gateway manager for each service agreement signed. This reuses behaviour from service start-up.

Failure of a Client Application
1. As shown in FIG. 8, having been notified of a Client Application failure, the FW reports this to each of the gateways.
2. Each gateway removes the stale reference from that gateway's list of valid Client Applications.

FW—Client FW Interfaces

Start-up (FIG. 6)
1. The Client FW performs the authentication handshake with the FW.
2. The Client FW uses the discovery interface to find the Parlay service(s) to required to run the End User Service.
3. The Client FW selects a Parlay service and specifies the number (n) of gateways that is required for resilience purposes. It also specifies the maximum number of Client Applications (m) that will bind to the Parlay service gateways This may be specified as part of the service level agreement.
4. When the Client FW signs the service agreement the FW returns references to a list of service gateway managers to the Client FW.
5. The Client FW passes global event notification information through the FW, e.g. the Number ranges that the application "owns". This information is stored in a database.

Failure and Restoration of a Gateway (FIG. 7)
1. Having detected a gateway failure, the FW reports this to the Client FW.
2. Having detected the restoration of a gateway and requested the instantiation of a new service gateway manager, the FW sends a report to the Client FW, passing the reference of the service gateway manager as a parameter.

Failure and Restoration of a Client Application (FIG. 8)
1. Having detected a Client Application failure, the Client FW reports this to the FW.

Client Application—Service Interfaces

Bind (FIGS. 6 & 7)
After start-up or after restoration of a Client Application, and the passing of service gateway manager references to the Client Applications:
1. The Client Applications bind to each of the service gateway managers in turn. Each service gateway manager allows no more than m Client Applications to bind to it.
2. Service gateway managers distribute events to the Client Applications using an appropriate distribution algorithm.

Failure and Restoration of a Gateway (FIG. 7)
1. The failure of a gateway is notified to the Client Application by:
   a) The Client FW reporting the failure or
   b) The Client Application directly detecting the failure (in the case of an implementation or protocol-specific) or timing out existing application sessions (e.g. an application call session).
2. API invocations relating to existing service sessions are not transferred to another gateway.
3. API invocations for new service sessions are transferred to an alternative gateway. This is done using an appropriate distribution algorithm to distribute invocations between the remaining gateways.
4. On gateway restoration, the Client FW passes on a reference to the new service manager to the Client Applications, which bind to the new service manager.

Failure and Restoration of a Client Application (See FIG. 8)
1. The failure of a Client Application is notified to the gateways by:
   a) The FW reporting the failure
   b) The gateways directly detecting the failure (in the case of an implementation or protocol specific failure) or timing out existing service sessions (e.g. call session).
2. API invocations for existing application sessions are not transferred to another Client Application.
3. API invocations for new application sessions (initial event notification) are transferred to an alternative Client Application. This is done using an appropriate distribution algorithm to distribute invocations between the remaining Client Applications
4. The restored Client Application binds with each of the service gateway managers.

Client FW—Client Application Interface

Start-up (FIG. 6)
1. The Client FW passes the list of service gateway manager references to all its Client Applications.

Failure and Restoration of a Gateway (FIG. 7)
1. Having received a report from the FW on the failure of a gateway, the Client FW forwards this information to the Client Applications.
2. Each Client Application removes the stale reference from its list of valid gateways.
3. On restoration of the gateway, the Client FW passes the reference to the new service gateway manager to all its Client Applications for them to bind to.

Failure and Restoration of Client Application (FIG. 8)
1. The Client FW detects the failure, raises an appropriate alarm and reports the failure to the FW.
2. The Client FW detects the restoration of the Client Application.
3. The Client FW passes the list of service gateway manager references to the restored Client Application to bind to.

What is claimed is:

1. A method of operating a communications network including one or more service nodes providing resources for running communications services over the communications network, a registration server arranged to control access by client applications to the one or more service nodes, and a platform remote from the registration server running one or more communications client applications, the method including:
   (a) distributing data identifying service resources available on the or each service node connected to the communications network, the or each service node providing resources for running communications services over the communications network;
   (b) communicating to the registration server a request for access by at least one of the client applications running on the said platform to at least some of the service resources identified in step (a);
   (c) at the registration server, in response to the request of step (b), executing a digitally-signed access agreement permitting access by the client application to the one or more service nodes providing the said requested services resources, the digitally-signed access agreement being stored at the registration server with associated data including the identity of said client application and of the one or more said service nodes wherein;
   the digitally-signed access agreement is a single agreement specifying a specific fixed number of instances of the client application and a specific fixed number of services nodes; and
   the specific fixed number of instances of the client application is greater than one and/or the specific fixed number of service nodes is greater than one; and
   (d) thereafter, in response to execution of the digitally-signed access agreement in step (c), binding the specific fixed number of instances of the client application to the specific fixed number of service nodes.

2. A method according to claim 1, wherein when at step (d) a specific fixed number greater than one of instances of the client application is bound to the specific fixed number of service nodes, the method further includes distributing successive initial event notifications between the specific fixed number greater than one of instances of the client application.

3. A method according to claim 1, including registering a specific fixed number greater than one of service nodes with the specific fixed number of instances of the client application, the method including distributing successive initial session requests between the specific fixed number greater than one of services nodes.

4. A method according to claim 1, further comprising a step, carried out by the registration server, of repeatedly polling a specific fixed number greater than one of service nodes registered with the registration server, and communicating to the or each client application running on the platform instance data indicating any change in the availability of the service nodes.

5. A method according to claim 1, wherein when a specific fixed number greater than one of client application instances are registered with the registration server, the method further comprises repeatedly polling each of the specific fixed number greater than one of client application instances registered with the registration server, and communicating to the or each service node data indicating any change in the availability of the client application instances.

6. A communications network comprising one or more service nodes, a registration server arranged to control access by client applications to the one or more service nodes providing resources for running communications services over the communications network, and a platform remote from the registration server running one or more communications client applications, the network being further arranged to operate a method comprising:
   (a) distributing data identifying service resources available on the or each service node connected to the communications network, the or each service node providing resources for running communications services over the communications network;
   (b) communicating to the registration server a request for access by at least one of the client applications running on the said platform to at least some of the service resources identified in step (a);
   (c) at the registration server, in response to the request of step (b), executing a digitally-signed access agreement permitting access by the client application to the one or more service nodes providing the said requested services resources, the digitally-signed access agreement being stored at the registration server with associated data including the identity of said client application and of the one or more said service nodes wherein;
   the digitally-signed access agreement is a single agreement specifying a specific fixed number of instances of the client application and a specific fixed number of services nodes; and
   the specific fixed number of instances of the client application is greater than one and/or the, specific fixed number of service nodes is greater than one; and
   (d) thereafter, in response to execution of the digitally-signed access agreement in step (c), binding the specific fixed number of instances of the client application to the specific fixed number of service nodes.

7. A registration server for implementing an interface to a communication network, the registration server comprising:
   a receiver for receiving an access request for service resources from a client application being executed; and
   a processor for executing a digitally-signed access agreement permitting access by the client application to a specific fixed number of-service nodes providing the service resources in response to the received access request, the digitally-signed access agreement being stored at the registration server with associated data including the identity of said client application and of the specific fixed number of service nodes and specifying a specific fixed number greater than one of instances of the client application and subsequently binding the specific fixed number greater than one of instances of the client application to the specific fixed number of service nodes by executing the digitally-signed access agreement in accordance with the identity data associated with the digitally-signed access agreement, wherein the digitally-signed access agreement is a single agreement specifying in its associated identity data a specific fixed number greater than one of instances of the client application and a specific fixed number greater than one of service nodes and the or each of the service nodes provides resources for running communications services over the communications network.

8. A registration server for implementing an interface to a communications network, the registration server comprising:
  a receiver for receiving an access request for service resources from a client application being executed; and
  a processor for executing digitally-signed access agreement permitting access by the client application to a specific fixed number of service nodes providing the service resources in response to the received access request, the digitally-signed access agreement being stored at the registration server with associated data including the identity of said client application and of the specific fixed number of service nodes and specifying a specific fixed number greater than one of service nodes and subsequently binding one instance of the client application to a specific fixed number greater than one of service nodes by executing the digitally-signed access agreement in accordance with the identity data associated with the digitally-signed access agreement, wherein the digitally-signed access agreement is a single agreement specifying in its associated identity data a specific fixed number greater than one of instances of the client application and a specific fixed number greater than one of service nodes and the or each of the service nodes provides resources for running communications services over the communications network.

9. A registration server for implementing an interface to a communications network, the registration server comprising:
  a receiver for receiving an access request for client resources from a client application being executed; and
  a processor for executing a digitally-signed access agreement permitting access by the client application to specific fixed number of service nodes providing the service resources in response to the received access request, the digitally-signed access agreement being stored at the registration server with associated data including the identity of said client application and of the at specific fixed number of service nodes and specifying a specific fixed number greater than one of service nodes and a specific fixed number greater than one of instances of the client application, and subsequently binding one instance of the client application to a plurality of service nodes and binding a specific fixed number greater than one of instances of the client application to one or more of the service nodes by executing the digitally-signed access agreement in accordance with the identity data associated with the digitally-signed access agreement , wherein the digitally-signed access agreement is a single agreement specifying in its associated identity data a specific fixed number greater than one instances of the client application and a specific fixed number greater than one of service nodes and the or each of the service nodes provides resources for running communications services over the communications network.

10. A method according to claim 1, wherein when step (d) includes binding a specific fixed number greater than one of instances of the client application to the specific fixed number of service nodes, the method further includes distributing initial event notifications between the specific fixed number greater than one of instances of the client application.

11. A method according to claim 1, including registering a specific fixed number greater than one of service nodes with the specific fixed number of instances of the client application, the method including distributing initial session requests between the specific fixed number greater than one of service nodes.

12. A method according to claim 1, wherein in the event of failure of a client application, a new event notification is automatically transferred to an alternative instance of the client application specified in the digitally signed access agreement.

13. A method according to claim 1, wherein in the event of failure of a service node, a new event notification is automatically transferred to an alternative service node in the digitally signed access agreement.

14. A method according to claim 1, wherein in the event of failure of a client application and a service node, a new event notification is automatically transferred to an alternative instance of the client application and an alternative service node specified in the digitally signed access agreement.

15. A registration server for implementing an interface to a communications network, the registration server comprising:
  a receiver for receiving an access request for service resources from a client application being executed; and
  a processor for executing a digitally-signed access agreement permitting access by the client application to a specific fixed number of service nodes providing the service resources in response to the received access request, the one digitally-signed access agreement being stored at the registration server with associated data including the identity of said client application and of the specific fixed number of service nodes and specifying a specific fixed number greater than one of service nodes and a specific fixed number greater than one of instances of the client application, and subsequently binding one of the instances of the client application to a specific fixed number greater than one of service nodes and/or binding a specific fixed number greater than one of instances of the client application to one of the service nodes by executing the digitally-signed access agreement in accordance with the identity data associated with the digitally-signed access agreement , wherein the digitally-signed access agreement is a single agreement specifying in its associated identity data a specific fixed number greater than one of instances of the client application and a specific fixed number greater than one of service nodes and the or each of the service nodes provides resources for running communications services over the communications network.

* * * * *